even though  
United States Patent

Knowles

[15] 3,670,019
[45] June 13, 1972

[54] CERTAIN N-DIHALOACETYL-CYCLOHEXYLAMINES

[72] Inventor: Richard N. Knowles, Hockessin, Del.
[73] Assignee: E. I. du Pont de Nemours and Company, Wilmington, Del.
[22] Filed: April 20, 1967
[21] Appl. No.: 634,131

[52] U.S. Cl. ....................................................260/561 HL
[51] Int. Cl. .........................................................C07c 103/12
[58] Field of Search ...................260/551, 561, 563, 561 HL;
167/46, 47

[56] References Cited

UNITED STATES PATENTS 3,007,786  11/1961  Hamm et al. ..........................260/561
2,852,560  9/1958   Brust ......................................260/561
3,356,724  12/1967  Olin .......................................260/561

*Primary Examiner*—Leland A. Sebastian
*Attorney*—Herbert W. Larson

[57] ABSTRACT

N-Dihaloacetylcyclohexylamines of the formula:

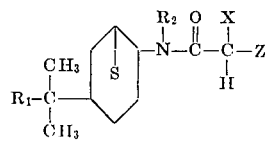

wherein
R$_1$ is hydrogen or alkyl,
R$_2$ is hydrogen or alkyl,
X is halogen, and
Z is halogen. Typical is N-dichloroacetyl-4-t-butylcyclohexylamine useful for repelling animals.

9 Claims, No Drawings

CERTAIN N-DIHALOACETYLCYCLOHEXYLAMINES

BACKGROUND OF THE INVENTION

The following applications relate to compounds containing cyclohexyl ring structures and having utility as animal repellants: application Ser. Nos. 532,544, filed Mar. 1, 1966, now abandoned, 574,276, filed Aug. 18, 1966, 574,495, filed Aug. 18, 1966, 574,496, filed Aug. 18, 1966, 574,498, filed Aug. 18, 1966, and 574,499, filed Aug. 18, 1966.

I have now discovered an additional class of compounds containing a cyclohexyl ring structure and having utility as animal repellants.

SUMMARY OF THE INVENTION

I have discovered that animal repellant activity is shown by the following compounds:

(1) 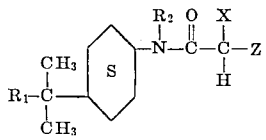

wherein
$R_1$ is hydrogen or alkyl containing one through five carbon atoms,
$R_2$ is hydrogen or alkyl containing one through three carbon atoms,
X is halogen, and
Z is halogen.

Preferred because of excellent animal irritant activity at low rates of application are those compounds of formula (1) wherein $R_1$ is methyl and $R_2$ is hydrogen.

Particularly preferred because of outstanding animal irritant activity at low rates is N-dichloroacetyl-4-t-butylcyclohexylamine.

Utility

Compounds of this invention cause potent irritation to animal tissue, particularly to the mucous membranes.

Animals exposed to the above compounds show signs of severe respiratory irritation. These compounds have two advantages over currently used animal repellants such as dried blood for deer, allylisothiocyanate for dogs, zinc dithiocarbamate-amine complex for rodents, and bone tar oil for deer. One, the compounds are more potent at low concentrations and two, provide residual activity over longer periods of time.

Compounds of this invention and particularly cis/trans mixtures of N-dichloroacetyl-4-t-butylcyclohexylamine have potential use as dog repellants, rodent repellants, deer repellants and for contaminating caves or underground tunnels.

Preparation

The compounds of this invention can be prepared by treating a 4-branched-alkylcyclohexylamine with a dihaloacetic anhydride in dimethylacetamide (DMAC) or a dihaloacetylhalide in pyridine. These reactions are illustrated below in Reactions I and II respectively. $R_1$, $R_2$, X and Z are as defined in formula (1) above.

I
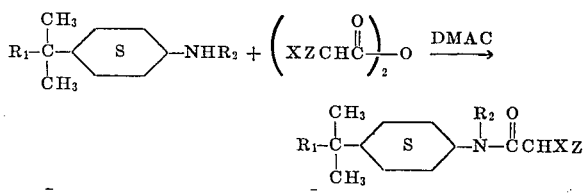

II
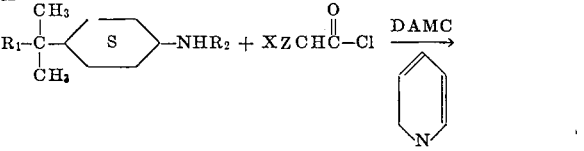

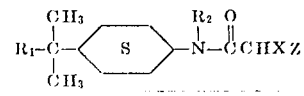

The acid chloride exemplified in Reaction II can be replaced by the acid bromide if desired.

The dihaloacetamides are isolated from either the dimethylacetamide solution or pyridine solution by dumping the solution into 10 to 100 times its volume of water. The product initially separates as an oil and then subsequently crystallizes. The crystals are filtered, washed several times with water and air dried.

Compositions

Compounds of this invention can be administered alone but are generally contained in a composition with an inert diluent non-toxic to animals. The diluent selected depends on the route of administration.

Emulsifying agents can be used with the diluent and compound of formula (1) to aid in dispersion of the active ingredient. Emulsifying agents that could be used include alkylaryl polyethoxy alcohols, alkyl and alkylaryl polyether alcohols, polyoxyethylene sorbitol or sorbitan fatty esters, polyethylene glycol fatty esters, fatty alkylol amide condensates, amine salts of fatty alcohol sulfates plus long chain alcohols and oil soluble petroleum sulfonates.

The amount of emulsifying agent in the composition will range from 0.1 to 20 percent by weight.

Since the compounds of the present invention would generally be administered by vapor or spray application, the compositions will contain a liquid diluent such as water, acetone, hexane, gasoline, kerosene, other hydrocarbon oils, alcohols or other liquids generally used in pharmaceutical preparations.

The amount of active ingredient in the composition will vary from 0.005 percent by weight to 95 percent or even higher. The diluent will generally constitute the major proportion of the composition and the amount of active ingredient will be less than 50 percent by weight. The exact concentration of the active ingredient will depend on the mechanism used for administration and will be easily understood by one knowledgeable in pharmaceutical application rates.

Application

A quantity of active ingredient sufficient to cause irritation to animal tissue is 100 to 10,000 micrograms per liter of air at exposure of 1 minute. It is expected that this rate applies to all animals. Rates of over 10,000 micrograms per liter of air at exposure of one minute kill 50 percent of the mice which are treated.

The following additional examples are provided to more particularly explain the invention.

EXAMPLE 1

A stirring solution of 14 grams (0.09 mole) of 4-t-butylcyclohexylamine in 15 ml. of dimethylacetamide in a 50 ml. Erlenmeyer flask is treated with 29 grams (0.12 mole) of dichloroacetic anhydride. A vigorous, exothermic reaction occurs; the temperature is held below 70° C. during the addition by ice bath cooling. The brownish-yellow solution is stirred for 10 to 15 minutes, and then it is poured into 500 ml. of water. The oil which separates crystallizes with scratching. The crystals are filtered, and washed with several 100 ml. portions of distilled water. The N-dichloroacetyl-4-t-butylcyclohexylamine is about a 1:1 cis:trans mixture and melts from 120° to 129° C. The yield is 23.9 grams (99 percent of theory).

Anal. Calc'd. for $C_{12}H_{21}Cl_2NO$: C, 54.1; H, 7.9; Cl, 26.6; N, 5.3%.

Found: C, 54.0; H, 7.8; Cl, 26.3; N, 5.4%.

The cis/trans ratio of the product is determined on an F & M Model 500 Gas Chromatograph using a 2 feet × ¼ inch O.D. stainless steel column packed with 10 percent Carbowax 20M on 60–80 mesh Diatoport T using a column temperature of 225° C., an injection port temperature of 280° C., a block temperature of 312° C., and a helium flow rate of 60 cc./min. The cis isomer has a retention time of 13.4 minutes, and the trans isomer has a retention time of 22.8 minutes. The cis/trans ratio was 78/22.

In another experiment where the cis/trans ratio is 52/48, the product melted from 135° to 145° C.

The isomer mixture can be used for the purpose of this invention without separation.

Mice are treated by aerosol exposure to this cis/trans mixture of N-dichloroacetyl-4-t-butylcyclohexylamine in the following manner: The compound is administered as an aerosol into a 2.8 liter chamber. The exposure chamber consists of a 2.8 liter bell jar over a nebullizer inserted through the floor of the chamber. Mice are exposed for five minutes to 600 micrograms per liter (3,000 Ct). The compound is dissolved in 1.4 ml. of acetone and during a span of 20 seconds the compound is sprayed up into the chamber. No further air is transferred into or out of the chamber during the five minute exposure.

After this exposure, irritant effects are observed in all mice exposed, but not in controls exposed to 1.4 ml. of acetone alone. Irritant effects can be described as the presence of one or more of the following reactive signs:
 a. Lacrimation,
 b. Abnormal gait,
 c. Depression,
 d. Dyspnea, and
 e. Face-pawing.

EXAMPLES 2–5

The following compounds are made in the manner of the N-dichloroacetyl-4-t-butylcyclohexylamine of Example 1 by substituting like molar amounts of the appropriate reactants for the 4-t-butylamine and dichloroacetic anhydride of Example 1. They produce similar irritant effects upon administration to animals.
 2. N-Dichloroacetyl-4-t-octylcyclohexylamine.
 3. N-Dibromoacetyl-4-t-butylcyclohexylamine.
 4. N-Dibromoacetyl-4-(1,1-dimethylbutyl)cyclohexylamine.
 5. N-Dichloroacetyl-4-(1,1-dimethylhexyl)cyclohexylamine.

EXAMPLE 6

Pyridine (50 ml.) is treated with 19 grams (0.1 mole) chlorobromoacetyl chloride with stirring and cooling. The mixture is stirred for one-half hour and then 15 grams (0.1 mole) of 4-t-butylamine is added. The reactants are stirred for one hour and then the solution is poured into 500 ml. of water. The N-chlorobromoacetyl-4-t-butylcyclohexylamine separates as an oil which subsequently crystallizes. It is filtered, washed with water, and air dried.

This compound is formulated and applied in like amount of $C_t$ in a manner similar to N-dichloroacetyl-4-t-butylcyclohexylamine of Example 1 to provide like results.

EXAMPLES 7–10

The following compounds are made in the manner of the N-chlorobromoacetyl-4-t-butylcyclohexylamine of Example 6 by substituting like molar amounts of the appropriate reactants for the 4-t-butylamine and the chlorobromoacetyl chloride. These compounds can be formulated and applied in a manner similar to that given in Example 1 to produce like results.

7. N-Chlorobromoacetyl-4-t-octylcyclohexylamine.
 8. N-Difluoroacetyl-4-t-butylcyclohexylamine.
 9. N-Chlorobromoacetyl-4-(1,1,3-trimethylpentyl)cyclohexylamine.
 10. N-Methyl-N-dichloroacetyl-4-t-butylcyclohexylamine.
 11. N-Dichloroacetyl-4-isopropylcyclohexylamine.

EXAMPLE 12

A 2 percent solution of N-dichloroacetyl-4-butylcyclohexylamine in dichloromethane is dispersed into and through a chamber containing the test animals. This aerosol is generated by feeding the solution of test compound through a commercial paint sprayer jet at a rate of 10 ml./min., and dispersing the spray with a stream of air having a flow rate of 44 liters/min. supplied at a pressure of 62 psi. The efficiency of forming respirable particles ranges from 10 to 40 percent. This aerosol gives a chamber concentration of 3.6 mg./liter; the particles have a mass median diameter of 1.6 microns with a geometric standard deviation of 2.6 microns.

After young, adult, male guinea pigs are exposed to this aerosol for 1 minute, lacrimation and salivation are observed. These irritant signs persist for one-half hour after the exposure.

When gerbils are exposed to this aerosol for 1 minute face pawing and tremors are observed. The face pawing persists for 5 minutes and the tremors persist for 10 minutes after the exposure.

I claim:
1. A compound of the formula:

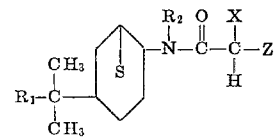

wherein
 $R_1$ is selected from the group consisting of hydrogen and alkyl of one through five carbon atoms;
 $R_2$ is selected from the group consisting of hydrogen and alkyl of one through three carbon atoms;
 X is halogen; and
 Z is halogen.
2. A compound according to claim 1 which is N-dichloroacetyl-4-t-butylcyclohexylamine.
3. A compound according to claim 1 which is N-chlorobromoacetyl-4-t-butylcyclohexylamine.
4. A compound according to claim 1 which is N-dichloroacetyl-4-t-octylcyclohexylamine.
5. A compound according to claim 1 which is N-dichloroacetyl-4-(1,1-dimethylpentyl)cyclohexylamine.
6. A compound according to claim 1 which is N-dibromoacetyl-4-t-butylcyclohexylamine.
7. A compound according to claim 1 which is N-dibromoacetyl-4-t-octylcyclohexylamine.
8. A compound according to claim 1 which is N-difluoroacetyl-4-t-butylcyclohexylamine.
9. A compound according to claim 1 which is N-dichloroacetyl-4-isopropylcyclohexylamine.

* * * * *